Sept. 5, 1967  B. C. KOWALSKI  3,339,391
STRETCH BENDING MACHINE
Filed Dec. 4, 1964  3 Sheets-Sheet 1
FIG. 1
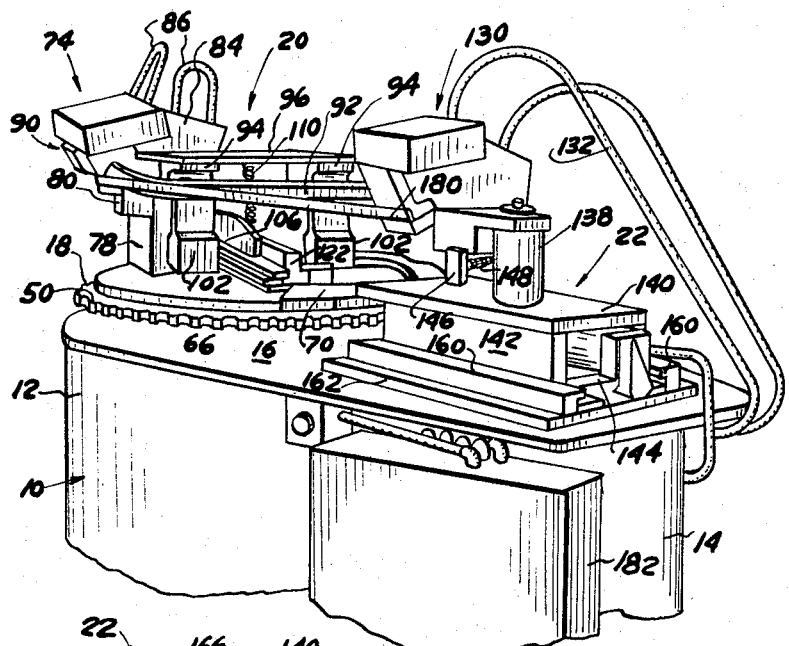
FIG. 5
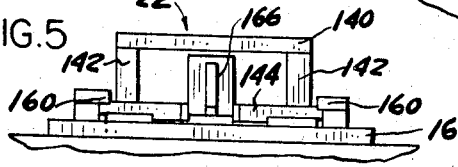
FIG. 4
FIG. 6
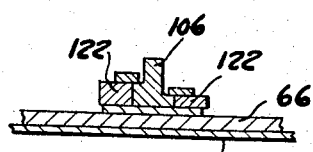
FIG. 7
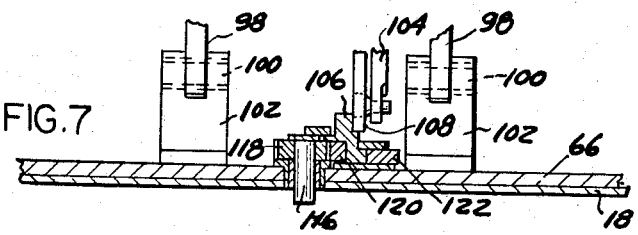
INVENTOR
BEN C. KOWALSKI
BY
ATTORNEY

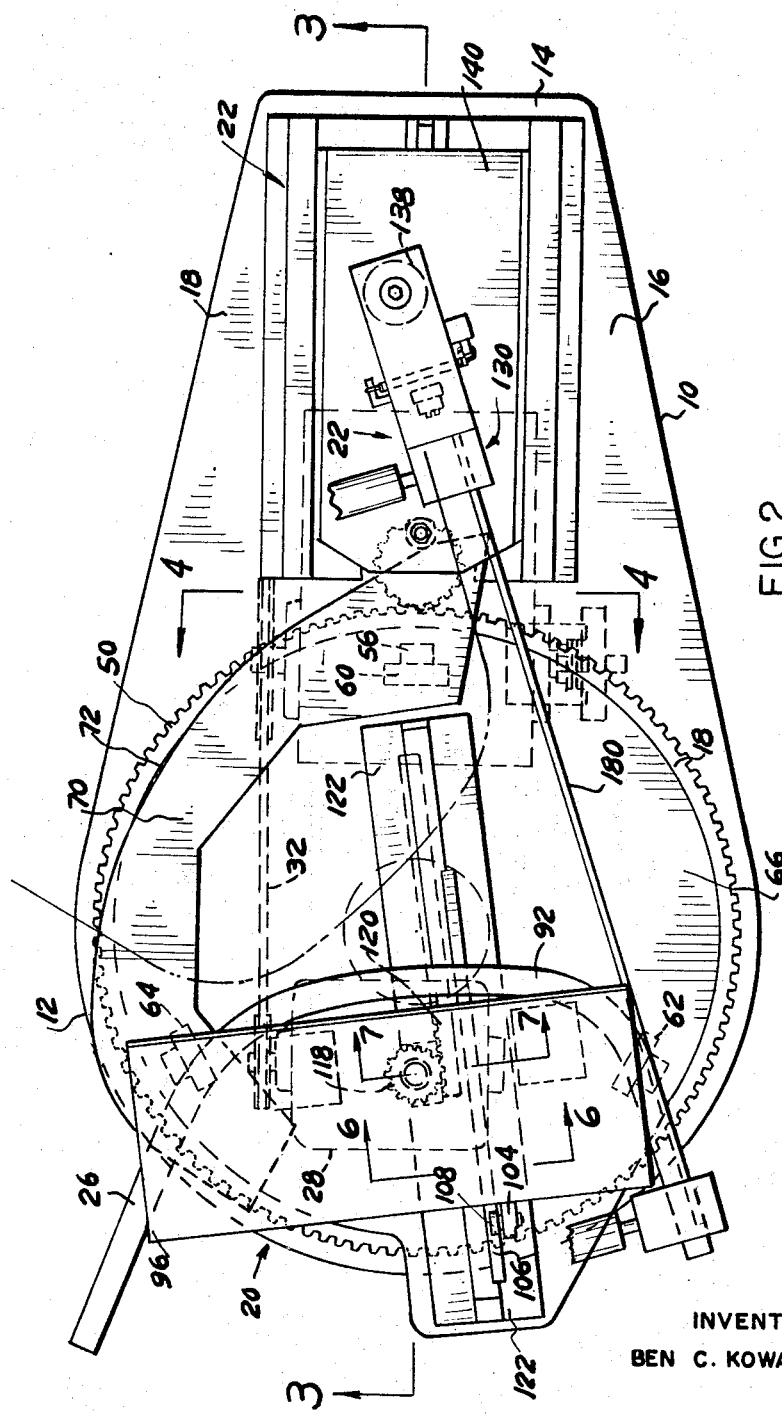

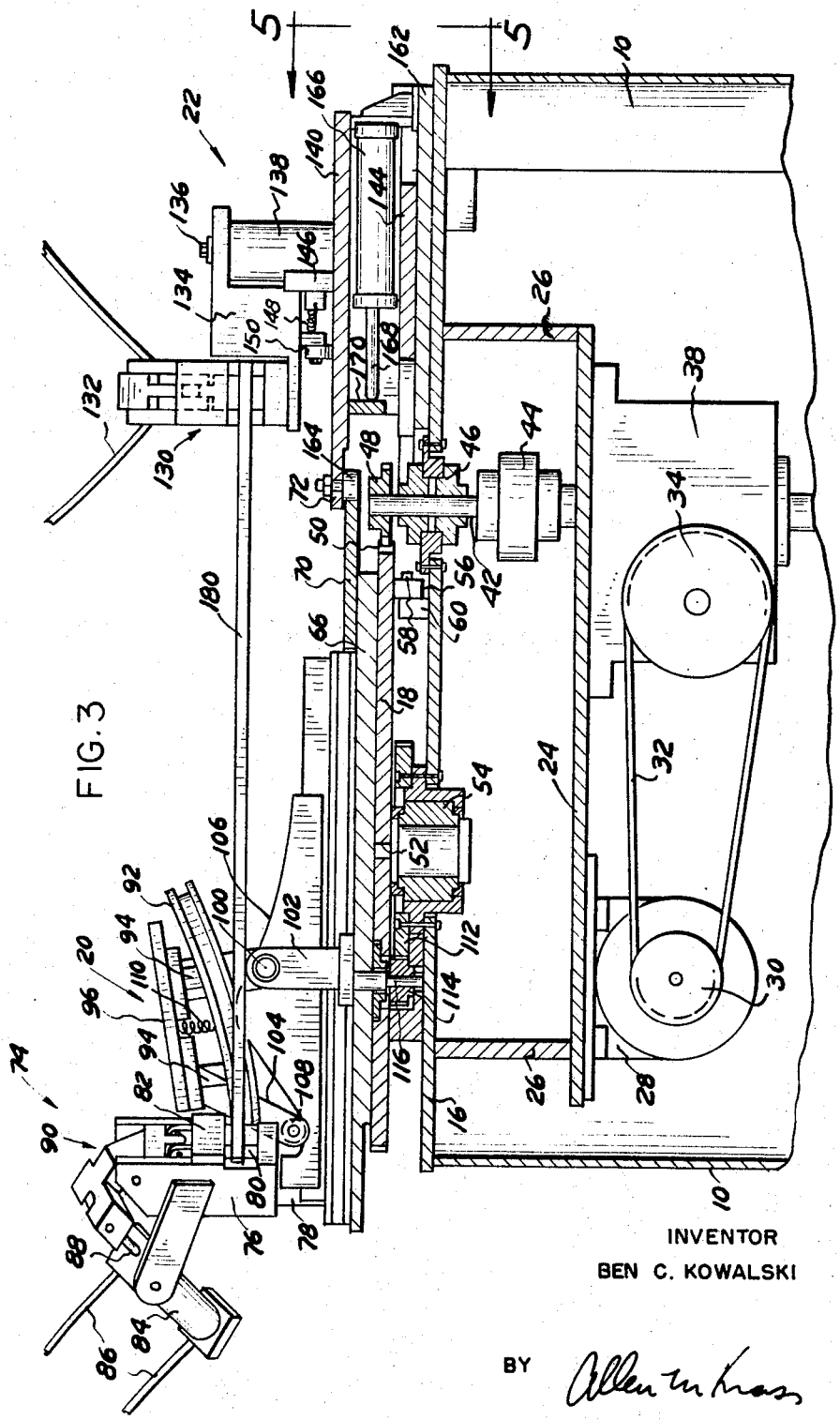

United States Patent Office 3,339,391
Patented Sept. 5, 1967

3,339,391
STRETCH BENDING MACHINE
Ben C. Kowalski, 3174 Wendover,
Birmingham, Mich.
Filed Dec. 4, 1964, Ser. No. 416,008
10 Claims. (Cl. 72—151)

ABSTRACT OF THE DISCLOSURE

A machine for bending elongated metal moldings employs a rotatably supported horizontal table and a slide supported for motion in the plane of the table toward and away from the center of rotation of the table. A clamp for one end of the molding is supported on the table and a clamp for the other end on the die. A bending form is also supported on the table. A hydraulic cylinder urges the slide against a cam which is supported by the table so that the position of the slide with respect to the table varies as the table is rotated through a drive system. A molding gripped in the two clamps is stretched between the slide and table and successive sections of the molding are brought into abutment with the bending die as the table rotates. The bending die is supported on the table for pivoting motion about and axis parallel to the table and a second cam controls the pivot of the die in timed relation to the rotation of the table so as to form compound bends in the molding.

---

This invention relates to a machine for bending metal moldings without collapsing the edges thereof or otherwise distorting the cross-section by means of imposing tensile stresses on particular sections of the molding simultaneously with the occurrence of bending forces. The invention more specifically relates to such a machine which has a unique configuration so as to be capable of simultaneously forming bends in two perpendicular planes and, which machine is low in cost and reliable in operation.

The present invention falls within that class of stretch bending machines wherein a molding section to be bent is first secured by clamps at its opposite ends. At least one of the clamps is then caused to rotate in a direction generally away from the other clamp. As the clamps rotate, it brings successive sections of the molding into contact with the bending form. A cam mechanism disposed between the clamps allows a limited movement of one toward the other so that the stretching action may be varied during the clamps rotational movement. The cam is designed in connection with the form so that the tensile stress imposed upon the molding at any given moment is a function of the degree of bend which is being imposed on the section of molding coming into contact with the form at that instant.

The machine of the present invention supports a first clamp and the bending form on a rotatable table. The second clamp is supported for sliding motion along a line radial to the center of rotation of the table, and may also be adapted to pivot about a vertical axis in order to accommodate its grip to the constantly changing inclination of the molding as the bending action proceeds. The cam which control the motion of the second clamp toward and away from the table is supported on the table and thus rotates with respect to the second form supported as the table is turned. A fluid cylinder presses the slide carrying the second clamp against this cam and the rotation of the table thus causes the slide and the second clamp to move toward and away from the table, and the first clamp, to impose the proper tensile stress on the mold section at all times. Both the first clamp and the bending form are pivotably supported on the first table for motion about a horizontal axis. Motion of the first clamp and the bending form about this axis causes the mold section to be bent about an axis generally perpendicular to the axis on which it is stressed. The rotation of the first clamp and the form about this horizontal axis is achieved by motion of a second cam which moves along the rotary table in timed relation to the rotation of the table. The motion of this cam is achieved by a rack connected to a gear that is supported on the rotary table and walks about a stationary gear as the table rotates. The rotation of this gear drives the rack and moves the cam so as to cause the first clamp and the bending form to rotate about its horizontal axis. Spring means are provided for urging a follower against the cam.

One of the primary features of the machine of the present invention is that the support for all the tooling, i.e. the clamps and the bending form, are supported directly on the rotating plate and the sliding plate. These two members may be formed with suitable engaging means so as to support any particular set of tooling in the required position for use in the machine. This is to be contrasted with previous machines wherein the tooling formed an integral part of the operating mechanism of the machine so that it was necessary to replace these operating elements each time the tooling was changed.

A primary object of the present invention is to form a stretch bending machine having a single rotating plate and a single sliding plate adapted to move toward and away from the rotating plate, such plates being adapted to support all of the necessary tooling for forming any molding within the range of the machine.

Another object is to provide such a machine wherein a pair of cams are moved in timed relation to the rotation of the table in order to control the tensile stress imposed on the molding and to cause the tooling to rotate about a horizontal axis in order to provide bends in two perpendicular planes.

Another object is to provide such a machine wherein a single rotary motor energizes all of the necessary motions of the machine.

Other objects, advantages, and applications of the present application will be made apparent from the following detailed description of a preferred embodiment of the invention. The description makes reference to the accompanying drawings in which:

FIGURE 1 is a perspective view of a stretch bending machine representing a preferred embodiment of my invention;

FIGURE 2 is a top view of the machine;

FIGURE 3 is a sectional side view of the machine taken along lines 3—3 of FIGURE 2;

FIGURE 4 is a detailed sectional view of the driving motor taken along lines 4—4 of FIGURE 2;

FIGURE 5 is a detailed side view of the slide mechanism taken along lines 5—5 of FIGURE 3;

FIGURE 6 is a detailed sectional view of the vertical bend cam mechanism taken along lines 6—6 of FIGURE 2; and FIGURE 7 is a detailed sectional view of the bending form hinge mechanism taken along lines 7—7 of FIGURE 2.

Referring to the drawings, the preferred embodiment of the bender is supported on a base having vertical side walls 10 formed of bent and welded steel sheets. The walls 10 are formed to include a section 12 which is generally circular about a vertical axis and two sides which extend tangent to the circle and terminate in a short end 14. A top plate 16 is formed of steel plate which has a configuration similar to the side wall 10 with a semicircular section joined by tangent lines to a shortened end. On its top side the base 16 supports two general structures. One is a turntable 18 which carries one molding clamp, the bending form, and a vertical bending mechanism generally indicated at 20. The other assembly generally indicated at 22 supports the other molding clamp for linear movement toward and away from the turntable 18. On its lower side the base 16 supports the drive assembly for these mechanisms.

Considering the assembly in greater detail a horizontal subbase plate 24 supports a spaced distance below the underside of the base 18 by a pair of vertical plates 26 which have their upper ends attached to the lower side of the base 16 and have their lower ends attached to the upper side of the subbase 24. An electric motor 28 is fixed to the underside of the subbase 24 and its output shaft drives a pulley 30. A belt member 32 transfers the motion of the pulley 30 to a second pulley 34 which drives a horizontal shaft 36 constituting the power input to a right angle drive and gear reducer mechanism 38.

The input shaft to the reducer 38 is double ended and the end opposite to that which supports the pulley 34 carries a brake mechanism 40 which is adapted to lock the mechanism against rotation upon being energized. The gear reducer and right angle drive 38 is also supported on the lower side of the subbase 24. The output shaft of the drive and gear reducer 38 passes upward through the subbase 24 and is connected to an output shaft member 42 by a coupling member 44. The shaft 42 is journalled in a ball bearing set 46 which is retained in an opening in the base plate 16. The upper end of the shaft 42 carries a pinion gear 48 which is in mesh with a ball gear 50 formed about the perimeter of the rotary table 18.

The rotary table 18 is supported on a stub shaft 52 which is journalled in a bearing assembly 54 retained in another aperture in a base plate 16. A cam roller 56 supported on a horizontal shaft 58 bears against the bottom of the turntable 18 near its perimeter adjacent to the drive gear 48 and acts to maintain the table in a horizontal plane against forces which may be imposed upon it during the bending of a molding. The shaft 58 is retained on a block 60 supported on the base 16. Similar cam-supporting assemblies 62 and 64 are spaced at regular intervals about the base plate.

A tooling plate 66 which retains the work clamp, the bending form, and other mechanism which must be changed when different moldings are to be operated on by the machine, is bolted to the upper side of the rotary table. A cam 70 which has a formed cam surface 72 extends for approximately 180 degrees around one perimeter of the tooling plate 66. The cam 70 is operative to control the motion of the assembly 22 toward and away from the center of the turntable 18 as the turntable rotates, in a manner which will subsequently be described.

The tooling plate 66 supports one of the two molding clamps, generally indicated at 74, on its upper side. It generally comprises a clamp assembly 76 fixed above the tooling plate on a support 78. The clamp member 76 includes a fixed lower jaw 80 and a vertically slidable upper jaw 82 which is supported on the assembly for movement toward and away from the lower jaw. The upper jaw 82 is actuated by a hydraulic or pneumatic cylinder 84 powered from a suitable source (not shown) through lines 86. The cylinder's rod 88 connects to a cam linkage generally indicated at 90 which is operative to move the upper jaw 82 toward the lower jaw when the cylinder extends its rod and to retract the upper jaw from the lower jaw as the rod 88 retracts. The jaws of the clamp member are designed for the specific molding being operated upon and are adapted to grasp a channel section molding without distorting its configuration. The exact design of the clamp assembly 74 is not of importance to the invention.

The molding is adapted to be bent about an elongated molding form 92 which has a specific configuration determined by the section of the molding being bent and the form of the bends to be made in the molding. The form may be of the same configuration as employed in connection with other molding machines such as that disclosed in U.S. Patent Nos. 2,887,143 and 2,944,582. The bending form 92 is supported above the tooling plate 66 on a pair of uprights 94 which are attached to the underside of a form support plate 96. The form support plate is retained on a pair of spaced arms 98 which are supported above the tooling plate 66 for rotation about a horizontal axis. The arms 98 are each journalled by pins 100 journalled in upright brackets 102 mounted on the tooling plate 66. The pitch of the form support 96 and the bending form 92 with respect to the table is controlled by an arm 104 which extends down from the underside of the form plate 96 and makes contact with a cam 106 by means of a horizontally journalled cam follower 108. A spring 110 is connected to one side of the plate 96 and to the tooling plate 66 and acts to urge the bending form support 96 against the cam 106.

The cam 106 is moved linearly with respect to the form plate 96 in timed relation to the rotation of the tooling plate 66 through a mechanism which includes a stationary gear 112 supported on the base plate 16 around the bearing 54. This gear 112 is engaged by a pinion 114 which is journalled on a shaft 116 that extends through the tooling plate 66 and the turntable 18. As may best be seen in FIGURE 7, the upper end of the shaft 116 drives a gear 118 which is in mesh with a rack 120 fixed to and extending along the length of the cam 106. The rack and the cam are supported for sliding motion on top of the tool plate 66 by means of a set of ways 122. The ways 122 journal the cam 106 on its sides and top edges so that they are thereby oriented for linear motion with respect to the tooling plate.

As the turntable 18 rotates under the power of the motor 28 as transmitted through the reducer 38, the pinion 114 walks about the stationary gear 112 and causes the upper drive gear 118 to rotate so as to translate the rack 120 linearly. The cam therefore moves with respect to the bending form 92 and the form support plate 96 is pivoted about the supports 102 in timed relation to the rotation of the table as a function of the configuration of the cam 106.

The other end of the molding is supported in a clamp generally indicated at 130 which may be of the same configuration as the clamp 74. It is powered by a pair of hydraulic lines 132 from the same hydraulic or pneumatic power source (not shown). The clamp 130 retains a mount 134 which is supported for a pivoting motion about a vertical axis on a shaft 136 journalled in a bearing member 138. The bearing 138 is fixed to the upper side of the plate 140 which forms the top of a sliding assembly 22. The mount 134 is urged in the direction of the stop 146, also supported on top plate 140 by a spring 148 which connects the support to the stop. A cam roller 150 is journalled to the lower side of the support 134 and bears against the plate 140 so as to accept bending moments produced by the clamp 130.

The assembly 22 includes a pair of side plates 142 fixed to the undersides of the edges of the plate 140 and a bottom plate 144. The slide assembly 22 is journalled for movement along the base plate 16 in a set of ways 160 which are supported above the plate 16 on a subplate 162. A cam roller 164 is supported on the lower side of one extreme of the plate 140 so that it abuts the cam 70 which is supported on the tooling plate 66. The entire slide assembly 22 is moved so as to urge the cam follower 164 against the cam 70 by a hydraulic or pneumatic cylinder 166 which is fixed beneath the plate 140 and has its rod 168 abutting against a plate 170 fixed below the top plate 140. The cylinder 166 is continually energized and acts in the manner of a spring to bias the slide against the cam 70.

In operation a precut length of metal molding 180 having an appropriate channel cross-section so that it must be stretched as it is bent, is loaded into the clamps 74 and 130. At this beginning of the cycle, the table 18 is rotated so that the clamps 74 are relatively close to the clamp 130. The clamps are actuated by a suitable power supply acting under the control mechanism contained in the panel 182. The exact nature of the control and the fluid power system does not form part of the invention, and is consequently not shown. After the two clamps have been closed about the ends of the molding the motor 28 is energized and begins to drive through the belt 32 and the reducer 38 to rotate the turntable 18 and the tooling plate 66 attached to it. The turntable is rotated in a clockwise direction as viewed in FIGURE 2. This brings one point on the molding 180 into contact with the initial section of the bending form 92. This position is illustrated in FIGURE 2. As the table 18 continues to rotate successive sections of the molding 180 are brought into contact with successive sections of the form 92. The tension on the molding at any particular moment is a function of the configuration of the cam 70 which allows the slide 22 to be moved in the general direction of the turntable 18 in order to control the tension imposed on the molding. The degree of tension thus imposed on the molding is a function of the curvature of the bend being made at any moment. As the bending progresses, the angle of the molding end changes with respect to the clamp 74 and the clamp pivots on the shaft 136 against the bias of the spring 148 to follow the molding. If the molding were just to be bent in a single plane it would not be necessary to pivot the form 92 about its support. However, when it is desirable to form bends in more than one plane the bending form 92 is shaped accordingly and the cam 106 is provided to cause the bending form to pivot as the table rotates in order to introduce the bends in the vertical plane. As has been described, this is achieved by the linear motion of the cam in timed relation to the rotation of the table 18 as powered by the gears 112 and 114.

After a bend has been completely formed in the molding the clamps are released and the molding is completed. It should be recognized that the machine is adaptable for forming bends in a single plane as well as in multiple planes and that the formation of the bending form and exact configuration of the various cams and clamps is well within the skill of those experienced in the art and does not form part of the present invention.

Having thus described my invention, I claim:

1. A machine for stretch bending molding, comprising: a frame; a table rotatably supported on the frame; a slide supported on the frame for motion toward and away from the center of said table; a first clamp for said molding supported on said table; a second clamp for said molding supported on said slide; a means for rotating said table; means for moving said slide toward and away from said table in timed relation to the rotation of said table; and a bending die pivotably supported on said table for movement about an axis parallel to the surface of said table.

2. The machine of claim 1 wherein power means are provided for causing the bending die to pivot about its support in timed relation to the rotation of the table.

3. The machine of claim 1 wherein the angle of the bending die with respect to the table is controlled by a cam which is supported on the table and arranged for movement with respect to the table in timed relation to the rotation of the table.

4. The machine of claim 1 in which the angle of the bending die with respect to the table is controlled by mechanism including a gear fixed with respect to the frame, a first pinion rotatably supported on the table and in mesh with said gear, a second pinion drivingly connected to said first pinion, a rack slideably supported on said table and in mesh with said second pinion, a cam fixed to said rack, and a cam follower fixed to the bending die and operative to follow the motion of the cam.

5. A machine for stretch bending metallic molding, comprising: a frame; a table rotatable on said frame; a slide supported on said frame for movement toward and away from the center of rotation of said table, said motion being in the plane of said table; a cam supported on said table; a cam follower on said slide, said cam and said follower being operative to control the distance between the slide and the table in timed relation to the rotation of said table; means supported on the frame for biasing said slide towards said table; a first molding clamp supported on said table; a second molding clamp pivotably supported with respect to said slide for rotation about and parallel to the axis of rotation of said table; means for biasing said second clamp in a particular directon wth respect to said slide; a bending form supported on said table; an electric motor; a gear reducer operative to receive the output of said motor; an electric brake unit connected to said gear reducer and operative to brake the rotation of the motor when energized; a gear supported around about the perimeter of said table; and a pinion gear driven by said gear reducer and in mesh with said gear so as to rotate said table as said motor rotates.

6. The machine of claim 5 wherein said means for biasing said slide toward said table consists of a fluid cylinder fixed on said frame having its rod connected to said slide.

7. The machine of claim 5 wherein said bending form is pivotably supported on said table for motion about an axis parallel to the surface of said table.

8. The machine of claim 5 wherein said bending form is pivotably supported on said table for motion about an axis parallel to said table and means are provided for causing said bending form to pivot with respect to the table in timed relation to the rotation of the table.

9. A machine for stretch bending metallic molding, comprising: a frame; a table rotatably supported on the frame; a slide supported on the frame for motion toward and away from the center of said table; a first molding clamp supported on said table; a second molding clamp supported on said slide; a bending die supported on said table for pivotable motion about an axis parallel to said table; means for rotating said table; a first cam device connected between said table and said slide for causing said slide to move toward and away from said table in timed relation to the rotation of said table; and a second cam device connected between the table and said bending die and operative to cause said bending die to pivot with respect to the table in timed relation to the rotation of the table.

10. The machine of claim 9 in which the molding clamp supported on said slide is pivotably supported about an axis parallel to the center of rotation of said table.

References Cited

UNITED STATES PATENTS 2,536,738  1/1951  Green _____ 72—151
2,893,460  7/1959  Raynes _____ 72—21

CHARLES W. LANHAM, *Primary Examiner.*

R. D. GREFE, *Assistant Examiner.*